UNITED STATES PATENT OFFICE

GEORGE B. OTTLEY, OF ARLINGTON, MASSACHUSETTS

QUICK DRYING INK

No Drawing. Application filed October 31, 1929, Serial No. 403,901.

This invention relates to a quick-drying ink. More particularly, it relates to a writing ink which, in addition to the ordinary properties of such inks, has new characteristics including a greatly increased rate of drying on paper.

Inks hitherto available for writing purposes require appreciable time for drying, which necessitates frequent blotting and constant care. This is always an annoyance; and in special cases is even a nuisance, as in the case of left handed people, who have a tendency to drag the hand across the freshly written characters. In other cases, as in book-keeping, or in making signatures, the necessity of applying a blotter makes many useless motions, and in the aggregate wastes a considerable amount of time. These and other objections show that it is desirable to have a quick drying ink, which can be covered almost immediately, without blotting; but none has been known, so far as I am aware.

It is an object of this invention to provide a practicable quick-drying ink, suitable for the purposes and free from the objections noted. It is a further object to provide a composition which may be added to commercial ink, and which, when so added, will impart thereto these desirable properties. The invention provides for decreasing the surface tension of the ink liquid, increasing the rapidity of its absorption into writing paper, and improving the distribution of the contained coloring matter.

To this end, I have found that by adding approximately one part of the composition which I have discovered to three parts, more or less, by volume of commercial ink various beneficial and desirable results ensue. In the combined form in which I prefer to use it, the composition which I have discovered consists of 10 parts diacetone alcohol, 30 parts cellosolve (monoethyl ether of ethylene glycol), 30 parts ethylacetate, and 30 parts acetone,—all by volume. In place of the cellosolve, there may be used thirty parts denatured alcohol or even 30 parts grain alcohol. These several ingredients are miscible with water, are rapidly and completely volatile, are good solvents, and are of low surface tension. The addition of these various ingredients to the ink brings about substantially no color change; but it is observed that the treated ink drips more freely from an ordinary pen point than the same ink before treatment, and that when applied to paper there is an increased rate of drying.

The inks to which this composition may best be added are those commonly used at the present time for writing, especially in fountain pens, including colored inks. Even with red ink, certain of the beneficial effects of my invention are found. The composition is not observed to affect printer's ink or other carbon inks and may therefore be said to work best with inks of the nature of ordinary writing fluids.

I have found, among other things, that despite the said observed increase of fluidity in driping from the point of a pen, the addition of these several ingredients to the ink produces an increase in viscosity, ranging from 20 to 30 per cent. By a comparative method based on rate of flow of liquid through a constricted orifice, the following relative values were obtained for the time of flow of a certain volume:

|  | Sample 1 | Sample 2 |
|---|---|---|
| Untreated writing ink | 16 |  |
| Untreated writing ink |  | 17 |
| Treated writing ink, as above described (cellosolve) | 21 |  |
| Treated writing ink, as above described (cellosolve) |  | 20 |
| Treated writing ink, as above described (alcohol) | 20 |  |
| Treated writing ink, as above described (alcohol) |  | 19 |

These figures show the said increase in viscosity approaching 20 to 30 per cent.

By a comparative method of determining relative surface tensions, based on capillary action, the following relative values were obtained:

|  | Sample 1 | Sample 2 |
|---|---|---|
| Untreated writing ink | 37 |  |
| Untreated writing ink |  | 36 |
| Treated writing ink, as above described (alcohol) | 26 |  |
| Treated writing ink, as above described (cellosolve) | 25 |  |
| Treated writing ink, as above described (alcohol) |  | 21 |
| Treated writing ink, as above described (cellosolve) |  | 23 |

These figures indicate that there is a substantial decrease in the surface tension.

In an effort to determine the relative rates of evaporation of the treated and untreated inks, I have found that if the untreated ink is permitted to dry in the atmosphere on glass, the time for drying is appreciably less than with the treated ink of the present invention. Similar results are obtained by permitting a drop each of treated and untreated ink to flow down a steep incline, taking the time for the ink surface to change from bright to dull as the basis for comparison. In this case, again, the treated ink requires a longer period than the untreated.

It is apparent from these results that the decrease in drying time which is obtained when the treated ink is used on paper does not result from an increased rate of evaporation of volatile constituents. On the other hand, it appears to follow that the desirable results obtained by adding my composition to ordinary ink arise from an increased rate of adsorption by the paper and perhaps an increased rate of penetration of the ink into the paper. This conclusion appears to be corroborated by the fact that on highly absorbent papers, such, for example, as blotting paper, a drop of the modified ink made possibly by this invention produces no corona or "water ring", whereas the ink from which it is made often produces a clearly defined ring. It may be stated, therefore, that when the composition herein disclosed is added to ordinary ink, the phenomenon of selective adsorption, which is accepted as responsible for the water ring effect, ceases to characterize the ink. This indicates that any suspended matter which would have formed the centre of the corona has been dissolved by the ingredients added, so that it flows to the limit. And it appears that the added water has in another way made it possible for the distribution of the coloring matter to be more perfect, for the flow from a writing pen point, on ordinary sized writing paper proceeds almost instantly to its final width and to such condition of dryness that one can immediately rub one's finger over it without producing a smooch.

As the ingredients specified are powerful solvents, and may be solvents for the size in the writing paper, quick penetration to a condition of dryness may be fostered in this manner. Also, the same result is promoted in so far as there is chemical affinity between any ingredient of the composition and the sizing. The solvents added to the ink evaporate at a lower temperature than does the water of the ink, and therefore would tend to carry off the water more rapidly, but the observed slowness of drying on glass, and the observed reduction of surface tension, indicate that the greater speed of drying is due to a greater of penetration of the paper, and adsorption by the paper rather than a greater rate of evaporation from its surface. The composition is therefore seen to be a penetrant, i. e. an agent promoting penetration. The increased viscosity, observed by the test above stated, might mean that when fed from a fountain pen the stream of ink deposited would be smaller than if ink were untreated; and this also would tend toward quicker drying.

The result is that ink obtained by the present invention is suitable for fountain pens, and, to a less extent, for pens with open points. There is no sediment due to added ingredients; the tendency appears to be to dissolve whatever matter is suspended in the ink to which the composition is added. The legibility is not impaired; the permanency appears to be increased; and resistance to water is enhanced. Inks treated according to the present invention appear to work well on writing paper which has been made with the usual sizing and finish for ink writing and on unglazed or semi-glazed paper and somewhat less satisfactory on highly glazed surfaces, probably because the glazing prevents or delays the above described penetration.

The added ingredients and the proportions thereof may be varied without departing from the invention, and other suitable penetrants can be used, but so far as I am aware the ingredients and proportions above stated constitute the best method of carrying out the invention. It is intended that the patent shall cover by suitable expression in the appended claims whatever features of patentable novelty exist in the invention herein disclosed.

I claim as my invention:

1. A writing ink containing diacetone alcohol, ethyl acetate, acetone and the monoethyl ether of ethylene glycol.

2. A writing ink containing 10 parts of diacetone alcohol, 30 parts of ethyl acetate, 30 parts of acetone and 30 parts of the monoethyl ether of ethylene glycol, the said parts signifying the approximate relative proportions of the said ingredients to each other.

3. A writing ink comprising the combination, with an operable writing ink, of ingredients additional to the said operable ink, which ingredients include diacetone alcohol, ethyl acetate, acetone and the monoethyl ether of ethylene glycol; the said combination being in proportions in which the totality of said added ingredients approximates a quarter of the whole.

Signed at Boston, Massachusetts, this thirtieth day of October, 1929.

GEORGE B. OTTLEY.

CERTIFICATE OF CORRECTION.

Patent No. 1,897,071. February 14, 1933.

GEORGE B. OTTLEY.

It is hereby certified that error appears in the printed specification of the above numbered patent requiring correction as follows: Page 1, line 70, for "driping" read "dripping"; page 2, line 42, for "water" read "matter"; line 48, for "cam" read "can", and line 65, after "greater" insert the word "rate" and that the said Letters Patent should be read with these corrections therein that the same may conform to the record of the case in the Patent Office.

Signed and sealed this 28th day of March, A. D. 1933.

M. J. Moore,
Acting Commissioner of Patents.

(Seal)